Feb. 19, 1963
R. LINDHOLM ETAL
3,077,671
DIRECT READING PRECISION GEAR CHECKER
Filed May 20, 1958
2 Sheets-Sheet 1
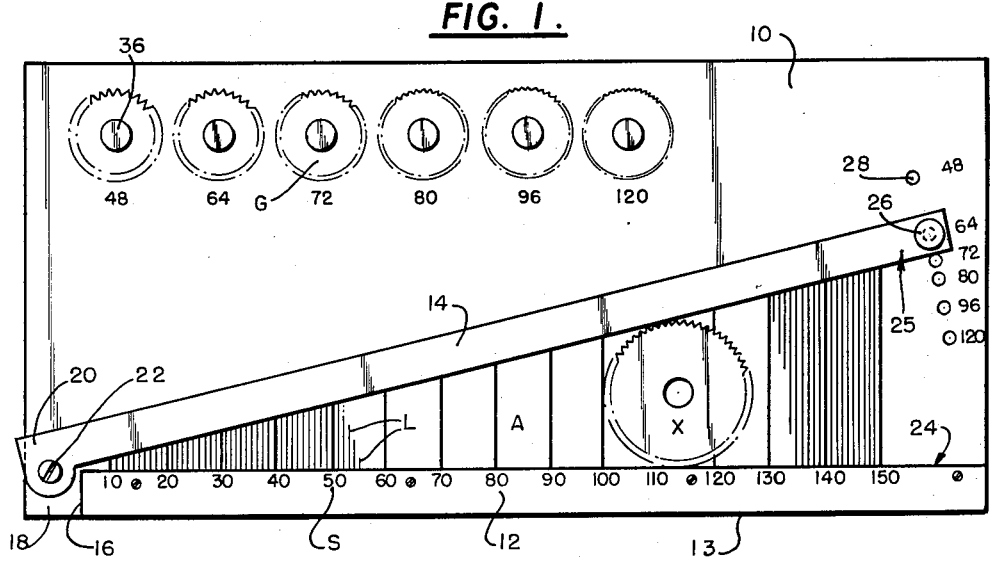
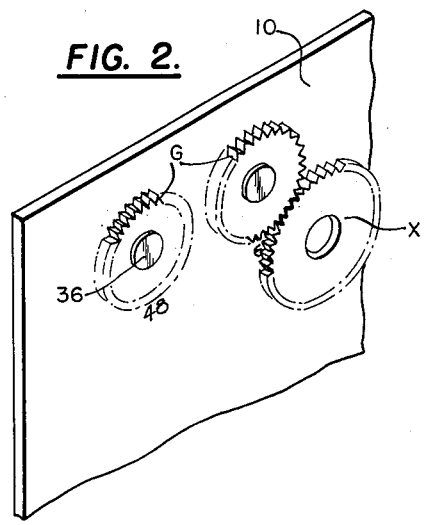
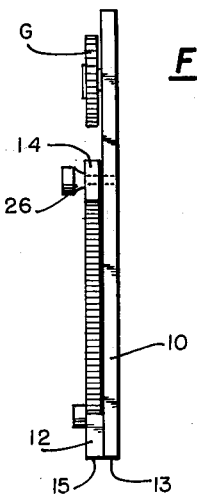
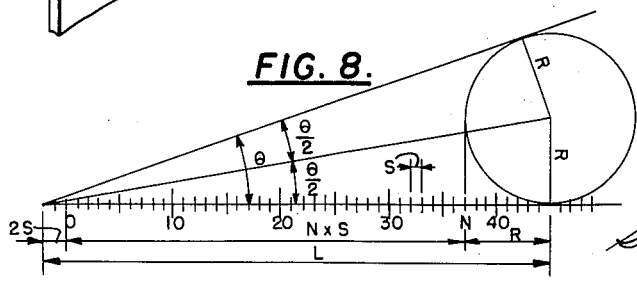
INVENTORS
Ralph Lindholm
Arthur Hayek
BY
Shapiro and Shapiro
ATTORNEYS

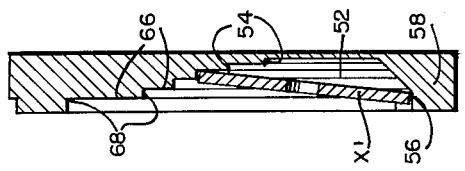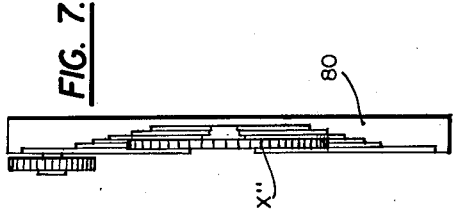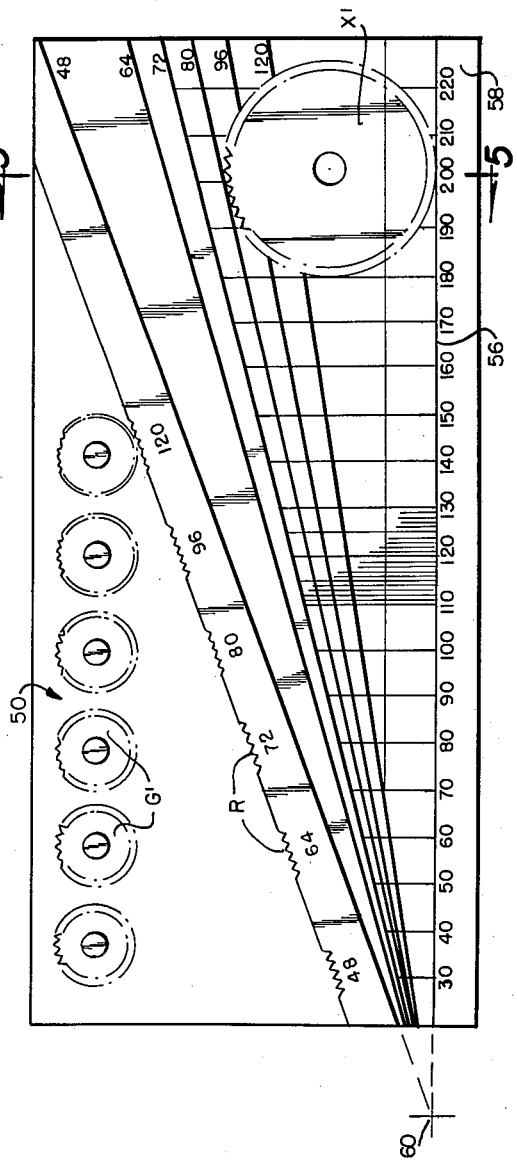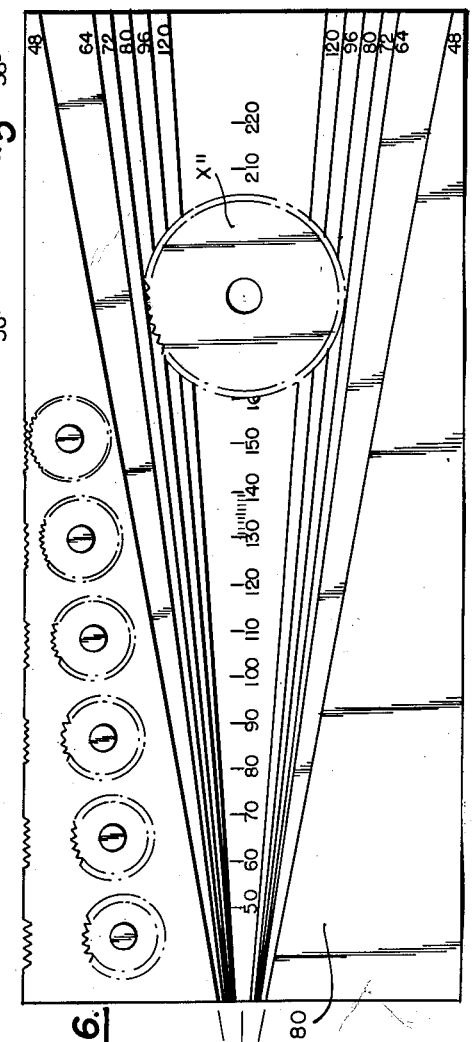
INVENTORS
Ralph Lindholm
Arthur Hayek
BY *Shapiro and Shapiro*
ATTORNEYS United States Patent Office 3,077,671
Patented Feb. 19, 1963

3,077,671
DIRECT READING PRECISION GEAR CHECKER
Ralph Lindholm, Gary Drive, Box 23, Chappaqua, N.Y., and Arthur Hayek, 66 Summit Place, Pleasantville, N.Y.
Filed May 20, 1958, Ser. No. 736,589
11 Claims. (Cl. 33—179.5)

This invention relates to a checking device or gauge used to determine the diametral pitch and number of gear teeth of spur gears by direct-reading means. The invention is particularly useful to makers and users of fine pitch gears, and especially to builders of precision equipment, such as computers and analyzers, who stock various types of precision gears that may not be duly labeled or identifiable.

The usual method of checking the number of teeth of gears that are not adequately labeled or otherwise identifiable is to make an actual count of each tooth of the gear. This is a tedious, time-consuming, costly and often inaccurate way of checking, particularly where the number of teeth of the gear is large.

The main object of the present invention is to provide a simple and inexpensive direct-reading precision gear checker which is easy to use and by which the desired information may be obtained quickly and accurately. The gear checker herein disclosed determines the number of teeth in a spur gear of known diametral pitch.

Another object of the invention is to provide a gear checker which has means whereby diametral pitch may be determined quickly and easily prior to checking the number of teeth, in the case of gears of unknown diametral pitch.

Other objects and advantages more or less ancillary to the foregoing reside in the specific construction and aggroupment of the elements peculiar to this structure, as will become apparent from a more complete examination of this specification and the accompanying drawings, which illustrate exemplary embodiments of the invention.

Briefly stated, the invention comprises a panel having thereon straight-edged abutments defining therebetween at least one wedge-shaped area into which a gear to be checked may be placed flatwise. The area is provided with a calibrated scale which gives a direct reading of the number of teeth on the gear when the diametral pitch is known. Standard gears are provided to permit the determination of unknown diametral pitches.

In the drawings:
FIGURE 1 is a plan view of one embodiment of the invention;
FIGURE 2 is a perspective view showing a gear being checked for diametral pitch as a preliminary step in determining the number of teeth in the gear;
FIGURE 3 is an end elevation of the device shown in FIGURE 1;
FIGURE 4 is a plan view of a modified form of the invention;
FIGURE 5 is a sectional view taken along line 5—5 of FIGURE 4;
FIGURE 6 is a plan view of a further modified form of the invention;
FIGURE 7 is an end elevation of the device shown in FIGURE 6; and
FIGURE 8 is an explanatory diagram.

The device shown in FIGURES 1 to 3, inclusive, comprises generally a rectangular panel 10 made of aluminum or other suitable metal, or if desired, of plastic. Although shown as rectangular it will become obvious that the panel may have some other form. Mounted on a surface of the panel 10 for cooperation therewith are a fixed bar 12 and a movable bar 14. For convenience the fixed bar 12 is arranged along the lower elongated edge 13 of the panel 10, as viewed in FIGURE 1, and has its outer edge 15 flush with the edge of the panel as may be seen in FIGURE 3. Adjacent the lower left-hand corner of the panel, as viewed in FIGURE 1, the fixed bar 12 terminates short of the end of the panel as indicated by the reference numeral 16, leaving a space 18 to accommodate the enlarged end 20 of the bar 14, which is pivotally mounted upon the panel 10 in the space 18 by means of a pivot pin or screw 22. The pin 22 has its center located in alignment with the straight edge 24 of the fixed bar 12 and the straight edge 25 of the bar 14. The bar 14 is thus mounted for adjustment about its pivot through various angles, and it will be clear from the description thus far that the fixed bar 12 and the adjustable bar 14 define between them an adjustable wedge-shaped area A.

The free end of the adjustable bar 14 is provided with a pin 26 which is adapted to be received within any one of several positioning holes 28 representing different diametral pitches for gears to be checked. The vertical play at pivot pin 22 and the natural resiliency of the adjustable bar are sufficient to permit the pin 26 to be raised out of a hole 28 for transfer to another hole. These holes 28 are arranged along an arc, having as its center the center point of the pin 22. Each hole is identified by a number, such as 48, 64, etc., representing a predetermined diametral pitch.

The wedge-shaped area A which is exposed between the fixed bar and the adjustable bar in its most divergent position of adjustment has delineated thereon a calibrated scale which in the embodiment illustrated consists of a plurality of lines L running perpendicular to the straight edge 24 of the fixed bar 12. Each line L represents the spacing of one gear tooth. Arranged along the straight edge 24 of the fixed bar 12 is a series of numerals constituting a scale S corresponding to the lines of calibration and enabling the user of the device to identify any line by number. On this scale the numbers indicate the number of teeth in the gear to be checked. The scale markings may be applied to the panel by any suitable process such as machine-engraving, lithography, or silk-screen printing.

The device described thus far is used as follows:
To check a gear X of known diametral pitch, the bar 14 is positioned so that pin 26 enters the hole 28 corresponding to the diametral pitch. The gear is then inserted in the wedge area A formed by the fixed horizontal straight-edged bar and the adjustable bar. With the gear X moved as far to the left of the wedge area as it will go, it has reached a position where its periphery is in tangential contact with two abutments, namely, the adjustable bar and the fixed bar, and with its left side tangentially touching a vertical calibration line. Each line L of the calibration scale represents the spacing of one gear tooth, and the direct reading is in terms of number of teeth for the gear X. In the example illustrated in FIGURE 1, the reading is 100, and therefore the gear X is determined to have 100 teeth. By inserting a gear of say one tooth less and correspondingly smaller outside diameter, the left side of the gear will now read to the next line of the calibrated scale or one tooth less.

An additional feature of this invention is the presence upon the panel of a plurality of standard gears G which may, for purpose of illustration, consist of six gears as shown in FIGURE 1, each of these gears having a predetermined known diametral pitch. In the embodiment illustrated, the gears G have diametral pitches ranging from 48 to 120. The standard gears are mounted on pins 36, being free to turn thereon for easy meshing with any gear to be checked. By trying each standard gear in turn, for proper meshing with the gear to be checked, the diametral pitch is directly read from the standard gear and serves thereafter to determine the setting of the angle of the adjustable bar. If the diametral pitch of the gear X were unknown, the meshing of such gear with the standard gear marked 64, as illustrated in FIGURE 2, would have indicated its diametral pitch to be 64 which then would have determined the setting of the adjustable bar with its pin 26 in the hole marked 64 as in FIGURE 1.

To summarize, if the diametral pitch of the gear to be checked is not known, the gear is first engaged with the known standard gears mounted on the panel by trying different meshings for a proper fit. When a proper fit is found, the unknown gear has a diametral pitch equal to that of the standard gear which meshes therewith. The number adjacent the standard gear indicates the diametral pitch of the unknown gear. The operator then sets the adjustable bar for that particular diametral pitch by inserting the pin 26 in the corresponding hole and then slips the unknown gear being checked into the wedge area or triangle as above described and reads the number of gear teeth directly off the graduated scale.

It should be noted that this direct-reading precision checker is not a gear gauge or inspection tool such as used to check gears for dimensional accuracy—tooth form, pitch diameter, run-out, etc. The gear checker of this invention simply determines the number of teeth in a spur gear of a given diametral pitch and outside diameter within the capacity of the checker. If the gear to be checked has a known diametral pitch all that is necessary is to insert it into the triangle formed between the fixed and adjustable bars.

The mode of use is simple, fast, and foolproof. No calculations are required. Errors are minimized. There is a saving of time and trouble and expense. The invention has particular value for checking a stock of unsorted and unlabeled gears, also for incoming inspection of gears to avoid costly and troublesome mismatches in actual assembly.

The gear checker will determine the number of teeth on any involute spur gear made in accordance with AGMA standards, commercial AGMA tolerances or better, either top hobbed or non-top hobbed generating method, metallic or non-metallic, 14½ degree or 20 degree pressure angle, hubless or other single hub only, or hubless compound gears with no more than two gears in a cluster.

The invention is based on sound mathematical principles and the equation used in establishing the angle $\theta$ for each position of the bar is as follows:

$$\theta = 2\tan^{-1}\left(\frac{1}{2PS+1}\right)$$

where P is the pitch of the gear and S is the spacing per tooth, in inches.

The derivation of this equation will be described as follows, reference being made to FIGURE 8 of the drawings for a better understanding:

The standard equation for the radius R of a spur gear is:

$$R = \frac{N+2}{2P}$$

where N is the number of teeth and P is the pitch of the gear.

Referring to FIGURE 8 of the drawing $$\frac{\theta}{2} = \tan^{-1}\left(\frac{R}{L}\right)$$

$$\theta = 2\tan^{-1}\left(\frac{R}{L}\right)$$

Substituting in this equation the value of R as seen above, and the value of L as seen in FIGURE 8 of the drawing, we get $$\theta = 2\tan^{-1}\left(\frac{(N+2)/2P}{S(N+2)+(N+2)/2P}\right)$$

$$\theta = 2\tan^{-1}\left(\frac{1}{2PS+1}\right)$$

As an illustrative example, assuming a gear to have a pitch P of 20, number of teeth $N=37$, and spacing S to be ⅛ inch, the equation will be applied as follows:

$$\theta = 2\tan^{-1}\left(\frac{1}{2\times 20\times \frac{1}{8}+1}\right) = 19°$$

Within the broader aspects of this invention other embodiments involving a somewhat different construction may be provided. One such embodiment is shown in FIGURES 4 and 5 wherein for purposes of illustration a generally rectangular panel 50 is shown. In this form of the invention the adjustable bar is omitted, the gear engaging abutments being formed integrally with the panel, which may be molded of a plastic material. The abutments are formed by molding in the face of the panel a depression 52 providing a series of steps 54. Viewed in plan, the depression in the face of the panel may be considered as a series of progressively diminishing wedge-shaped areas or triangles, all of which have a common base, namely, the straight edge 56 of the abutment 58 along the lower edge of the panel, and each of which has a hypotenuse intersecting the straight edge at a point 60 outside of the panel as indicated in FIGURE 4. Each succeeding step corresponds to a hypotenuse of a smaller triangle having the same base as the first-named triangle. Each succeeding step defines a more deeply depressed portion with respect to the outer face of the panel as clearly illustrated in FIGURE 5 of the drawings. By comparison with the form of device shown in FIGURES 1 to 3 it will now be understood that the embodiment shown in FIGURE 4, instead of having a variable triangular area controlled by a pivoted bar, has a series of fixed triangular areas, one for each predetermined diametral pitch of the gears to be checked. Accordingly, each of the steps is designated by a number which identifies the diametral pitch corresponding to the particular step. Thus at the right of the panel in FIGURE 4 each of the numbers 48, 64, 72, 80, 96, and 120 delineated on the panel identifies the respective diametral pitch for each of the progressively diminishing triangles. The panel is provided with a calibrated scale consisting of a plurality of closely spaced lines perpendicular to edge 56, each indicating one tooth of a gear as in the form shown in FIGURES 1 to 3, inclusive.

In the use of the device shown in FIGURES 4 and 5 the gear to be checked is slipped into the wedge-shaped area or triangle formed by the bottom straight edge bar and the selected step in accordance with its known diametral pitch; the gear is moved to the left until it contacts the two abutments consisting of the straight edge 56 and the riser of the selected step. At this time the abutments are both tangent to the outer circle of the gear. The scale line at the left of the gear in FIGURE 4 which is tangent to the circle of the gear indicates to the user of the device the number of teeth in the gear.

It will be observed from a study of FIGURE 5 that the common base line formed by the straight edge 56 at the bottom of the panel is the line from which all of the unknown gears are measured. Each of the steps consists of a step portion 66 and a riser portion 68. Accordingly, any gear that is being checked will be placed upon the straight edge 56 and dropped into the depression upon the step corresponding to its particular diametral pitch. Thus, for example, the gear $X^1$ shown in FIGURE 4 with an unknown number of teeth has a diametral pitch of 80. The gear fits into the depression, the lower peripheral portion of the gear resting on the straight edge 56 and the upper portion of the gear resting on the step marked 80. Then the gear is slid along toward the left as shown in FIGURE 4 until it comes into tangential contact with both abutments. At this point a reading is taken along the left side of the gear, the tangent line 180 as shown in FIGURE 4 indicating the number of teeth in this particular gear. Although, as shown in FIGURE 5, the gear $X^1$ may not lie exactly parallel to the plane of the panel surface, the divergence is so slight as to be negligible.

As in the case of the first-described embodiment, the device shown in FIGURE 4 may be provided with a series of standard gears $G^1$ for determining diametral pitch of a gear when desired. As shown in FIGURE 4, six such gears are provided, each being for a different diametral pitch. Accordingly, where the gear to be checked has an unknown diametral pitch as well as an unknown number of teeth, the diametral pitch can first be determined by matching the unknown gear with one of the standard gears as described in connection with the embodiment of FIGURE 1. Having determined the diametral pitch of the unknown gear, the number of teeth may then be determined as already described above.

The panel 50, as well as panel 10 of FIGURE 1, may be provided with an integrally formed series of gear racks R, each corresponding to a gear of a different diametral pitch. The racks may be upraised from a central portion of the panel or provided along an edge. Thus, as shown in FIGURE 4, there is a gear rack for 48 diametral pitch, one for 64 diametral pitch, one for 74 diametral pitch, etc. It will be understood that the standard gears and the gear racks provide alternate means for determining diametral pitch.

FIGURES 6 and 7 show another embodiment within the broad purview of the invention. This embodiment is generally similar to that disclosed in FIGURES 4 and 5 in that the panel 80 is made in one piece of plastic or another suitable material and the gear engaging abutments are formed integrally with the panel, the adjustable bar being omitted. As seen in FIGURE 6, the face of the panel is depressed to provide a series of progressively diminishing wedge-shaped or triangular areas, but in the present instance the triangular areas are arranged in the face of the panel in symmetrical fashion centered with respect to the longitudinal axis of the panel. All of the long lines which define the triangles meet at one point 86 to the left of the panel, so that the common apex of all of the triangles does not appear upon the panel itself but rather at an imaginary point on the outside of the panel. Each triangle represents one particular diametral pitch. Thus, the largest triangle represents a diametral pitch of 48 as indicated by the numerals upon the face of the panel; the next succeeding smaller triangle represents a diametral pitch of 64; the next succeeding smaller triangle represents a diametral pitch of 72, and so on. As viewed in FIGURE 7, the panel may be regarded as having formed in its face a series of pairs of descending steps, each pair of steps representing a particular diametral pitch as will be understood from a comparison of FIGURES 6 and 7. At the bottom of the steps, the portion of the face of the panel along the longitudinal central line thereof is provided, as indicated in FIGURE 6, with a series of vertical lines spaced apart a distance representing one tooth each. As in the case of the other forms of the invention described, a calibrated scale is provided with numbers from 50 to 220, for example, to facilitate the reading of the number of teeth indicated by the closed spaced lines.

In the use of the device shown in FIGURES 6 and 7, if the diametral pitch of the gear to be checked is known, the number of teeth can be determined very quickly by simply placing the gear upon the pair of steps corresponding to the known diametral pitch and moving the gear toward the left until it can move no further. At this point there are three lines of tangency to the circle of the gear, two of these lines being formed by abutments, in this case the risers of the two steps which have been contacted by the gear, the third line of tangency being a scale line at the left of the gear and indicating the number of teeth in the gear. Thus, for example, in the illustration of FIGURE 6, the gear $X^{11}$ to be checked has a diametral pitch of 72. Accordingly, the gear has been placed upon the pair of steps marked with the number 72. The gear has been moved along toward the left until it has come to a stop, and at this position of the gear there are three lines of tangency to the gear, two of these lines of tangency being formed by the risers of the steps marked 72, and the third line of tangency at the left of the gear being the scale line 160, which indicates that the gear has 160 teeth.

The embodiment disclosed in FIGURES 6 and 7 is also provided with a series of standard gears and a series of gear racks for alternate use as in the described embodiment of FIGURES 4 and 5. However, in the present instance, the gear racks are shown as being located along the upper edge of the panel. It will be understood that each standard gear represents a particular diametral pitch and that each gear rack along the upper edge of the panel likewise represents a particular diametral pitch. Where the gear to be checked has an unknown diametral pitch as well as an unknown number of teeth, the diametral pitch may first be determined by use of either the standard gears or the gear racks as described with regard to the embodiment shown in FIGURES 4 and 5. After the determination of the diametral pitch has been made, the tooth count may be determined in the manner already described above.

The embodiments shown in FIGURE 4 and FIGURE 6 have the advantage that, so far as the determination of the number of teeth in a gear is concerned, no movable part is involved in the use of the device, the adjustable bar having been eliminated. However, the initial tooling cost for the manufacture of the plastic panel may be greater.

While preferred embodiments of the invention have been shown and described, it will be apparent to those skilled in the art that changes may be made without departing from the principles and spirit of the invention, the scope of which is defined in the appended claims. Accordingly, the foregoing embodiments are to be considered illustrative rather than restrictive of the invention, and modifications which come within the meaning and range of equivalency of the claims are to be included therein.

We claim:

1. A direct-reading precision gear checker comprising, in combination, a panel having straight-edged abutment means for defining on said panel a plurality of wedge-shaped areas extending from a common apex, said areas having different predetermined apex angles with each angle corresponding to a different diametral pitch of gears to be checked, said panel having delineated thereon a single calibrated scale common to all said areas, said scale having on said areas a set of scale marks spaced along a line extending from said apex at intervals correlated with said apex angles and the corresponding diametral pitch, said scale having a set of indicia adjacent said scale marks for designating the number of teeth on a gear placed in the area corresponding to its diametral pitch with the gear periphery in contact with the abutment means defining that area and aligned with one of said scale marks.

2. The gear checker of claim 1, said abutment means comprising a fixed bar and a pivotally mounted bar, and means for setting said pivotally mounted bar in any one of a plurality of positions corresponding to different diametral pitches for gears to be checked.

3. The gear checker of claim 2, in which the means for setting the pivotally mounted bar comprises a plurality of holes in the panel arranged in an arc centered about the bar pivot, and the free end of the pivotally mounted bar has a pin extending therefrom and adapted to fit any one of the said holes.

4. The gear checker of claim 2, in which the panel is generally rectangular, the fixed bar is mounted on the panel along an edge thereof, and the pivotally mounted bar is mounted on the panel with its pivot located in a corner of the panel adjacent one end of the fixed bar.

5. The gear checker of claim 2, wherein said scale marks comprise parallel lines perpendicular to said fixed bar.

6. The gear checker of claim 1, in which the panel has thereon a plurality of standard gear means of different diametral pitch corresponding to said areas, whereby a gear of unknown diametral pitch can be matched to a standard gear means to determine the area to be utilized in checking the gear.

7. The gear checker of claim 1, the apex angle $\theta$ of each wedge-shaped area being related to the corresponding diametral pitch P and the spacing S between said scale marks in accordance with the following formula $$\theta = 2 \tan^{-1}\left(\frac{1}{2PS+1}\right)$$

8. The gear checker of claim 7, said apex being located beyond the zero point of said set of scale indicia by a distance equal to 2S.

9. The gear checker of claim 1, said abutment means comprising a plurality of steps formed on said panel and having associated indicia designating the diametral pitch of gears to be tested.

10. The gear checker of claim 1, said abutment means comprising a single abutment defining one side of all said areas and a plurality of progressive step abutments defining the other side of said areas, respectively.

11. The gear checker of claim 1, said abutment means comprising a plurality of pairs of progressive step abutments, each pair defining the sides of one of said areas.

References Cited in the file of this patent

UNITED STATES PATENTS

| | | |
|---|---|---|
| 27,140 | Maranville | Feb. 14, 1860 |
| 320,976 | Shedlock | June 30, 1885 |
| 1,065,994 | Williams | July 1, 1913 |
| 1,396,509 | Faltermayor | Nov. 8, 1921 |
| 1,951,322 | Bliss | Mar. 13, 1934 |
| 2,528,431 | Greenberg | Oct. 21, 1950 |
| 2,677,892 | Schecter | May 11, 1954 |
| 2,722,747 | Fritz | Nov. 8, 1955 |
| 2,901,834 | Miller | Sept. 1, 1959 |

FOREIGN PATENTS

| | | |
|---|---|---|
| 480,657 | Great Britain | Feb. 25, 1938 |
| 582,117 | Great Britain | Nov. 5, 1946 |

OTHER REFERENCES

Tool and Die Journal (T & D), p. 130, June 1949.